United States Patent Office 3,431,970
Patented Mar. 11, 1969

3,431,970
PROCESS FOR PRODUCING STRUCTURES
CONTAINING SHAPED VOIDS
Franciszek Olstowski and John G. Mezoff, Freeport, Tex., assignors to The Dow Chemical Company, Midland, Mich., a corporation of Delaware
No Drawing. Filed Mar. 22, 1965, Ser. No. 445,834
U.S. Cl. 164—97        14 Claims
Int. Cl. B22c 9/10; B22d 17/00

ABSTRACT OF THE DISCLOSURE

This invention relates to structures containing shaped voids prepared by compressing and forming expanded vermicular graphite, having an apparent bulk density of from about 0.1 to about 2.0 lbs./ft.$^3$, to a more dense form having structural integrity, inserting said compressed form into a mold as a core, and casting a hardenable material in said mold around said core. The invention also relates to a method for preparing a composite core by adding molten metal to a mold filled with expanded vermicular graphite. Said composite core is subsequently positioned in a pressure die casting mold whereby molten metal is cast about the core to form a thin layer thereon.

---

This invention relates to structures containing internal shaped voids and to a novel process for producing such structures. The invention relates more particularly to structures containing shaped internal cavities filled with a form of expanded graphite and to the method of preparing such structures by employing preshaped cores of the expanded graphite.

In the past, cast structures having preshaped internal voids have been prepared by the use of a sand core in conventional metal casting techniques. In general, these cores are composed of a refractory sand coated with a binder such as an organic polymer. This material is then premolded into the desired shape and cured or fired to form a rigid element. After positioning the core in the mold, the metal is cast around the core in the same mold. Once the metal has cooled, the core material must be removed. This is a tedious and time-consuming operation which leaves a hole in the outer surface of the casting. If an internal void is desired, it is necessary to then weld over the opening.

It, is therefore, an object of this invention to provide an improved method of producing structures containing shaped internal voids.

It is an additional object of this invention to produce new structures containing lightweight, preshaped internal cores.

It is a further object of this invention to provide a new casting process which produces comparatively lightweight castings with internal cores, without the necessity of removing the cores therefrom.

These and other objects may be attained by the practice of this invention described and claimed in the following sections hereof.

It has now been discovered that comparatively lightweight castings containing preshaped internal voids may be prepared by first preparing a void-forming element or core of a low density vermicular expanded graphite. The vermicular expanded graphite is compressed slightly but sufficiently to yield an element having enough physical strength to permit handling. Shaping and compressing of the element are generally accomplished at the same time and in the same step. This void forming element may then be placed in a mold, heated if necesary, and the molding material poured in and allowed to solidify to produce a molded structure having an internal core which is sufficiently lightweight that for most purposes it may be left in place and serve as a "void." This eliminates the tedious process of removing the core. However, if desired, this core material may be removed in the same manner as other cores.

The low density vermicular graphite referred to herein has a density in the range of about 0.1 to 2.0 lbs./ft.$^3$, preferably not more than 1 lb./ft.$^3$.

The expanded vermicular graphite referred to herein may be prepared by contacting a particulate natural crystalline graphite at about room temperature with (1) a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) fuming nitric acid, or (3) fuming sulfuric acid, or (4) concentrated sulfuric acid (at least about 90 weight percent $H_2SO_4$), or concentrated nitric acid (at least about 60 weight percent $HNO_3$) plus at least about 2 weight percent of a solid inorganic oxidizer such as, for example, manganese dioxide, potassium permanganate, chromium trioxide, potassium chlorate and the like. The resulting mixed components usually are employed on a weight proportion basis of from about 0.2–2/1 (acid member/graphite). These are maintained in contact for at least about one minute, although a lengthy contact time of hours or days is not detrimental. The acid-treated graphite now expandable, is separated from any excess acid, washed and dried if desired. The acidified graphite is then heated until exfoliation or expansion occurs to produce the vermicular expanded graphite.

Another method of preparing the expandable graphite, which is subsequently expanded for use in the method of the instant invention, is to treat particulate natural crystalline graphite with an aqueous peroxy-halo acid, preferably perchloric or periodic acid, using an acid concentration of from about 2 to about 70 weight percent or more and an acid/graphite weight proportion of from about 0.05–2/1. The acid treated graphite, now expandable, is separated from excess acid and dried, if desired, and heated to give the expanded vermicular graphite.

The particulate natural crystalline graphite also can be electrolyzed by serving as the anode in an aqueous acidic or aqueous salt electrolyte at an electrolyte temperature of from about 0 to about 80 degrees C. at a minimum cell potential of about 2 volts. The total quantity of electricity passed is equivalent to from about 10 to about 500 ampere-hours per pound of graphite. The electrically treated graphite, now expandable, is separated from the electrolyte solution and heated. The so-formed expanded vermicular graphite has a bulk density as low as 0.1 lb./ft.$^3$. For this application, it is generally preferred that the expanded vermicular graphite particles have a length-to-diameter ratio of 5:1 or higher. Such particles resemble rather long graphite "worms" rather than open "booklets" and exhibit superior felting properties.

The actual apparent bulk density of the final expanded product is determined in part by the temperature employed in the expansion operation. Satisfactory expansion of the aqueous peroxy-halo acid treated or electrolyzed crystalline material results at temperatures above about 150–200 degrees C. However, ordinarily temperatures of from about 500 degrees to about 2000 degrees C. or higher are used. Generally, as the temperature increases, the bulk density of the expanded product decreases. Ordinarily, graphite from all the acid treatments set forth hereinbefore are subjected to hydrocarbon fuel flames, e.g. propane torch (flame temperature about 1100 degrees C.), oxyacetylene torch (flame temperature of about 1500 degrees C. or higher) etc. for expansion. However, any method of heating such as heating in a furnace, heating by radiation, heating by high frequency, etc. may be used. The acid-treated or electrolyzed graphite flake particulate material is generally placed in contact with a flame to thereby effect expansions of from 200 to 600 fold. This method of heating causes expansion almost instantaneously, e.g. within a second.

The time required for expansion also is dependent to a large extent on the heating temperature. Generally as the temperature rises, the time required for heating decreases. However, within the operable expansion temperature range set forth herein ordinarily the expansion is completed in less than a minute and a maximum heating period of five minutes has been found to be satisfactory although unnecessarily long.

The expanded graphite resulting from this process is a vermicular, particulate product having a low apparent bulk density as set forth hereinbefore in comparison to the high density of crystalline graphite starting material. (To illustrate, a commercially available Madagascar flake graphite used as a starting material having a carbon content of greater than 80% and a nominal mesh size of from about 30 to about 50 U.S. Standard Sieve had an apparent bulk density of about 51.2 pounds per cubic foot; after acid treatment with a 1/1 weight ratio of concentrated $H_2SO_4$/concentrated $HNO_3$ in which 1 part of graphite to 1 part of acid mixture were combined and expansion at about 800 degrees C. this material had an apparent bulk density of 1.2 lbs./ft.$^3$.) The term "apparent bulk density" as used herein is the density determined from the volume occupied by a given mass of the product subjected to free fall (by gravity) into an open top container, e.g. a graduated cylinder.

As starting material for the treatment and expansion process, natural flake graphite or crystalline columnar (Ceylon) graphite can be used, but natural flake graphite is generally preferred. This material generally may have an initial particle size sufficiently small enough to pass through a 100 mesh screen (U.S. Standard) but be retained on a 200 mesh screen and may be as large as about 8 mesh. However, flake graphite having a mesh size between 16 and 80 is preferred. Particle sizes of as small as about 325 mesh may be used, especially if the peroxyhalo acid or the electrolytic treatment is employed, but these smaller particles tend to give bulk densities when the graphite is expanded, that are greater than the preferred limit of 1 lb./ft.$^3$ or less.

Slight compression of the expanded vermicular graphite produces a felted structure having sufficient structural integrity to be useful as a casting core. Generally, compression of the very lightweight particulate expanded graphite to a density of from about 1 to about 20 pounds per cubic foot produces a useful structure. Shaping and compression may be done simultaneously in a mold or precompressed blocks of graphite may be shaped by sawing, sanding, drilling or by additional compression in a properly designed mold. A very smooth, high gloss surface is produced on the compacted shaped graphite either by the compression itself or by rubbing the surface of the compacted graphite.

Preshaped core elements prepared from compressed vermicular graphite may be used in the casting (i.e. pouring a liquid into a mold wherein the liquid solidifies) of resin coating source material such as epoxy resins, phenolformaldehyde resins, silicones, acrylates and methacrylates, urethanes, polyolefins, styrenes, etc. and various mixtures and copolymers of these materials. Virtually any polymer, copolymer or terpolymer is operative as the resin coating source material to form a casting around a preshaped graphite core so long as it can be applied in a fluid state and hardened. Castings may also be made of inorganic materials such as plaster, concrete, glass or metals. The process is particularly advantageous with glass and metals. Such materials may be cast with any desired configuration and may contain voids or low density internal cores of virtually any desired shape including spheres, rods, polyhedrons, toroids as well as very complex volumetric configurations. These configurations when cast as occluded voids or occluded internal cores reduce the weight of the structure while maintaining rigidity and strength and at the same time may modify the acoustical, electrical, magnetic and thermal properties of the casting.

In shaping the desired shaped-void element, the vermicular graphite can be compressed to virtually any preferred density up to the density of graphite. Generally, the higher density material yields a structure that is more resistant to compressive deformation during the casting of molten metals.

The compacted vermicular graphite shapes having bulk densities in the range of 3 to 10 pounds per cubic foot are adequate as cores for metal casting in most instances. In any case, the vermicular graphite must be compressed at least to a fourfold reduction in volume to obtain a sufficiently interlocked structure to have useful structural integrity.

The pinning and positioning of the vermicular graphite element in the mold prior to the metal casting utilizes the conventional sand core pinning techniques such as the use of chaplets.

If binder-free shaped vermicular graphite is used as the void element, the mold and void element are heated to a temperature near that of the cast metal, otherwise serious distortion of the void may occur due to the sudden expansion of entrapped gases in the vermicular graphite. If it is not suitable to heat the mold to metal casting temperatures, the metal may be cast in a vacuum to remove the entrapped gas or the shaped vermicular graphite void element may be bonded with a char-forming binder and subsequently pyrolyzed to yield a carbon-cemented structure that is resistant to deformation by sudden heating. Other binders may be used to add strength to the compressed core so long as the binder is compatible with the conditions which will be encountered during casting.

By employing the process as defined herein numerous novel and useful articles may be prepared. A molded core of the desired shape may be placed in a pressure die-casting die which is slightly larger than the pre-formed core. The die and core are then raised to the proper temperature and metal is cast to the core. This produces lightweight strong articles having a thin metal skin. Typical of the articles which may be produced in this manner are bowling pins, baseball bats and the like.

Present methods of making magnesium and aluminum baseball bats and bowling pins involve first casting a shell core, removing the pre-formed material from the core, making a casting over the core and then filling the core with plastic or other material. The present invention improves over this semi-permanent mold process by eliminating some of the tedious and costly steps involved therein, by being more easily adaptable to automation, and by producing a superior product.

If desired, stiffening rods, tubes or other structures may be incorporated in the pre-formed compressed vermicular graphite core to add strength or stiffness or to correct an out-of-balance condition.

A variety of metals may be used to provide the metal skin of the articles produced herein. In general the light metals such as aluminum or magnesium and their alloys are preferred but such metals as lead, brass, zinc or even iron may be used.

In order to achieve superior bonding to the compressed vermicular graphite core, it is sometimes desirable to roughen the core or to provide one or more depressions therein so the metal skin will form a "tooth" within the core.

As an alternate embodiment of this invention, high strength cores having relatively lightweight may be produced by preparing a composite core of metal and expanded vermicular graphite and applying a skin thereto as described above. Such composite cores may be prepared by filling a mold with expanded but uncompressed graphite then introducing molten metal therein to fill the interstices between the particles. A similar result is achieved by adding expandable graphite to the mold, heating the mold sufficiently to expand the graphite then adding molten metal to form the composite core. Metal skins applied to these composite cores produce very strong structures having relatively light weight.

EXAMPLE I

Natural flake graphite passing through a 20-mesh screen and retained by an 80-mesh screen was treated with a concentrated $H_2SO_4$ plus concentrated $HNO_3$ mixture and then the treated particles were expanded by direct contact with a flame to yield a vermicular mass having an apparent bulk density of 0.2 pound per cubic foot. The vermicular graphite was then compressed in a cylindrical mold to yield a cohered slug measuring 1.5 inches in diameter and 2.0 inches long and having an apparent bulk density of 2.48 pounds per cubic foot. This compacted vermicular graphite slug was then positioned and pinned within a clay-graphite crucible using a 30-gauge stainless steel wire as core pins.

The clay-graphite crucible plus the contained and pinned graphite void element was then slowly heated to the casting temperature of aluminum. Next, molten aluminum was poured into the mold covering completely the graphite void element. When cooled, the casting was removed from the mold yielding an aluminum slug containing a totally enclosed "void."

In another instance, a low density aluminum casting was prepared in the following manner:

Low bulk density expanded vermicular graphite prepared for the previous example was compressed into approximately 1 inch diameter spheres having an apparent aggregate density of about 2.6 pounds per cubic foot.

A graphite crucible measuring 3½ inches diameter and 5 inches high was filled with these prepressed, low density graphite spheres. A steel mesh screen was wired down on the crucible to eliminate the buoyancy effect when pouring the molten aluminum. The steel mesh screen was mashed against the graphite spheres which caused further compaction and some deformation of the spheres.

Next, the crucible and graphite cores were heated slowly to about 650 degrees C. (to prevent the rupturing of the graphite spheres by sudden heating).

Molten aluminum (at a tempearture of about 710 degrees C.) was poured into the mold containing the spherical "voids" and allowed to solidify.

The cooled casting contained about 4 weight percent graphite in the form of spherical cores and the aluminum casting had an apparent density of 1.03 grams per cc. or 38.2 weight percent that of pure dense aluminum.

EXAMPLE II

Expanded vermicular graphite was compressed into about ½-inch diameter spheres having an apparent bulk density of about 3 pounds per cubic foot. A graphite crucible was filled with these low density graphite spheres and slightly compressed by a steel wire mesh screen. Next, a molten lead-bismuth alloy having a density of 9.7 gm./cc. was poured into the mold and allowed to solidify. The resulting casting, containing a matrix of spherical graphite cores was found to have an apparent density of about 2.7 grams per cc. The void-filled casting has a density only 28 percent that of the lead-bismuth alloy.

In another case, expanded vermicular graphite having an apparent bulk density of 0.2 pound per cubic foot was compressed into a cylinder measuring 1⁷⁄₁₆″ diameter and 1⅛″ high and having an apparent density of 0.09 gram per cc. This cylindrical graphite core was positioned in a cylindrical mold having a diameter of 1⁹⁄₁₆″ with the aid of ¹⁄₁₆″ diameter lead wires as spacers. Next, a molten lead-bismuth alloy was poured over the graphite void to yield on cooling a metal cylinder measuring 1⁹⁄₁₆″, and weighing 56 grams. This casting had an apparent density of 1.68 grams per cc. as compared with the alloy density of 9.7 grams per cc.

EXAMPLE III

Expanded graphite was blended with powdered pitch, slightly compressed into a low density brick, then pyrolyzed at 1000 degrees C. to yield a low density (4.7 pounds per cubic foot) carbon cemented vermicular graphite block. A slab measuring 2¼″ wide, 2½″ long, and ⅜″ thick was sawed from this graphite brick and positioned in a sand mold using ⅛″ diameter stainless steel dowells as pins. Cast iron was poured into the mold at a temperature of 2700 degrees F. The cooled casting was cut open to reveal the graphitic "void" which had retained its initial shape and dimensions.

EXAMPLE IV

A mold of the desired shape for the internal core of a bowling pin was prepared, evacuated and heated to 500 degrees C. Expandable graphite was then fed into the hot mold cavity and allowed to expand to fill the mold. Molten lead was then introduced into the mold cavity to fill the interstitial space between the graphite particles. The casting was allowed to cool, removed from the mold and placed as a core in mold having the desired external shape of a bowling pin. After heating the mold and core to 650 degrees C., molten aluminum was added to the mold to form a skin on the core. After cooling a completed bowling pin was removed from the mold having a relatively lightweight lead-graphite core and an aluminum skin.

We claim:
1. A process for casting structures containing preshaped voids, which comprises:
   (1) compressing and forming expanded vermicular graphite having an initial density of from 0.1 lb./ft.³ to 2 lbs./ft.³ to a more dense structure having structural integrity,
   (2) inserting said compressed form into a mold as a core, and
   (3) casting a hardenable material in said mold and around said core.
2. A process for casting structures containing preshaped voids which comprises:
   (1) forming a core by compressing expanded vermicular graphite having an initial density of from 0.1 to 1.0 lb./ft.³ to a structure having a density of from 1.5 to 10 lbs./ft.³,
   (2) inserting said compressed form into a mold as a core,
   (3) heating said mold and core to casting temperature, and
   (4) casting a hardenable material in said mold and around said core.
3. The process of claim 2 wherein the hardenable material is a molten metal.
4. The process of claim 2 wherein the hardenable material is a molten glass.
5. The process of claim 2 wherein the hardenable material is a cement.
6. The process of claim 2 wherein the hardenable material is a resin coating source material.
7. A process for producing lightweight articles having thin metal skins which comprises:
   (1) forming a core by compressing expanded vermicular graphite having an initial density of from 0.1 to 1.0 lb./ft.³ sufficiently to reduce the volume of the expanded graphite at least four fold,
   (2) inserting said compressed form into a pressure die casting mold sufficiently larger than said compressed form to permit a thin skin thereon,

(3) heating said mold and compressed form to molding temperatures,
(4) filling said mold with molten metal, and
(5) allowing said metal to cool and form a thin skin on compressed form.

8. The process of claim 7 wherein the metal is magnesium.

9. The process of claim 7 wherein the metal is aluminum.

10. A process for producing relatively lightweight articles having thin metal skins which comprises:
(1) preparing a composite core by filling a mold with expanded vermicular graphite and adding molten metal thereto to fill the interstices of said graphite,
(2) allowing said composite core to cool,
(3) inserting said core in a pressure die casting mold sufficiently larger than said core to permit a thin layer of metal between said core and said mold,
(4) filling said mold with molten metal, and
(5) allowing said metal to cool and form a skin on said core.

11. The process of claim 10 wherein the metal of the core and the metal of the skin are the same metal.

12. The process of claim 10 wherein the metal of the core and the metal of the skin are not the same metal.

13. The process of claim 11 wherein the metal is magnesium.

14. The process of claim 11 wherein the metal is aluminum.

References Cited
UNITED STATES PATENTS

| | | | |
|---|---|---|---|
| 3,239,319 | 3/1966 | Pollard | 164—97 |
| 3,353,258 | 11/1967 | Barton et al. | 29—453 |
| 1,137,373 | 4/1915 | Aylsworth | 252—378 |
| 1,191,383 | 7/1916 | Aylsworth | 252—378 |
| 3,104,196 | 9/1963 | Shannon. | |
| 3,247,294 | 4/1966 | Sabouni | 264—44 |

ROBERT F. WHITE, *Primary Examiner.*

K. J. HOVET, *Assistant Examiner.*

U.S. Cl. X.R.

23—209.1; 106—56; 164—231, 369; 264—250, 279